(12) United States Patent
Farlie

(10) Patent No.: US 11,080,730 B2
(45) Date of Patent: *Aug. 3, 2021

(54) WEBCAST SYSTEMS AND METHODS WITH AUDIENCE SENTIMENT FEEDBACK AND ANALYSIS

(71) Applicant: Nasdaq, Inc., New York, NY (US)

(72) Inventor: Matthew B. Farlie, North Caldwell, NJ (US)

(73) Assignee: NASDAQ, INC., New York, NY (US)

( * ) Notice: Subject to any disclaimer, the term of this patent is extended or adjusted under 35 U.S.C. 154(b) by 965 days.

This patent is subject to a terminal disclaimer.

(21) Appl. No.: 15/057,159

(22) Filed: Mar. 1, 2016

(65) Prior Publication Data

US 2016/0180361 A1 Jun. 23, 2016

Related U.S. Application Data

(63) Continuation of application No. 13/889,168, filed on May 7, 2013, now Pat. No. 9,305,303.

(51) Int. Cl.
*G06Q 30/02* (2012.01)
*G06Q 10/06* (2012.01)

(52) U.S. Cl.
CPC ....... *G06Q 30/0203* (2013.01); *G06Q 10/063* (2013.01); *G06Q 30/02* (2013.01)

(58) Field of Classification Search
CPC .............. G06Q 30/02; G06Q 30/0201; G06Q 30/0203; G06Q 30/0217; G06Q 30/0242; G06Q 30/0245; G06Q 10/063; G06Q 10/0639; H04N 21/2187; H04N 21/252; H04N 21/44218; H04N 21/8456; G06F 2203/011; H04L 65/4076; H04L 67/22
See application file for complete search history.

(56) References Cited

U.S. PATENT DOCUMENTS

| 6,947,966 B1 | 9/2005 | Oko, Jr. et al. |
| 7,403,910 B1 | 7/2008 | Hastings et al. |
| 7,617,127 B2 | 11/2009 | Hunt et al. |

(Continued)

FOREIGN PATENT DOCUMENTS

| EP | 1 308 907 | 5/2003 |
| GB | 2474074 | 4/2011 |
| WO | WO 2011/015878 | 2/2011 |

OTHER PUBLICATIONS

International Search Report issued in Application No. PCT/SE2014/050506 dated Sep. 1, 2014.

(Continued)

*Primary Examiner* — Kamran Afshar
*Assistant Examiner* — Marshall L Werner
(74) *Attorney, Agent, or Firm* — Nixon & Vanderhye P.C.

(57) ABSTRACT

A sentiment analysis computing system includes a storage medium and a processing system. Sentiment input is received from audience members viewing a streamed/webcasted event. The received input is stored to the storage medium. A time slice of the webcasted event is determined and sentiment inputs that are within that time slice are obtained. A sentiment value is calculated for the determined time slice based on aggregated sentiment values. The calculated sentiment value for the time slice is then output by the sentiment analysis computing system.

19 Claims, 12 Drawing Sheets

(56) References Cited

U.S. PATENT DOCUMENTS

| | | |
|---|---|---|
| 8,079,046 B2 | 12/2011 | Ali et al. |
| 9,129,008 B1* | 9/2015 | Kuznetsov ............ G06F 16/313 |
| 2008/0086742 A1 | 4/2008 | Aldrey et al. |
| 2008/0126197 A1* | 5/2008 | Savage .................. G06Q 50/01 |
| | | 705/319 |
| 2011/0275046 A1 | 11/2011 | Grenville et al. |
| 2012/0072939 A1* | 3/2012 | Crenshaw .......... H04N 21/4415 |
| | | 725/12 |
| 2013/0018957 A1* | 1/2013 | Parnaby ................ G06Q 10/10 |
| | | 709/204 |
| 2013/0204664 A1* | 8/2013 | Romagnolo ....... G06Q 30/0203 |
| | | 705/7.32 |
| 2013/0232516 A1* | 9/2013 | Paull ................ H04N 21/25883 |
| | | 725/13 |
| 2014/0282650 A1* | 9/2014 | Viles .................... H04N 21/812 |
| | | 725/13 |
| 2014/0337097 A1 | 11/2014 | Farlie |

OTHER PUBLICATIONS

Written Opinion issued in Application No. PCT/SE2014/050506 dated Sep. 1, 2014.

* cited by examiner

WEBCAST SYSTEMS AND METHODS WITH AUDIENCE SENTIMENT FEEDBACK AND ANALYSIS

CROSS-REFERENCE TO RELATED APPLICATION

This application is a continuation of application Ser. No. 13/889,168 filed May 7, 2013 and is incorporated herein by reference in their entirety.

TECHNICAL OVERVIEW

The technology herein relates to audience feedback systems and methods. More particularly, the technology herein relates to webcasting systems that provide audience sentiment feedback and analysis.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND

The Internet provides a dynamic way to distribute content to a diverse audience of users. A streaming distribution of such content is often referred to as "webcasting" where a particular piece of content (e.g., audio, video, etc) is distributed to many different consuming computing devices. Receiving feedback from an audience in response to "pushed" content is problematic in that companies have historically had a difficult time measuring audience reaction and feedback to the topic(s) being discussed in the webcast, both in real-time and after the fact.

One technique is to track user attendance (audience totals) over time, or in a single snapshot. This may be useful, but may also yield false-positives because of concurrent event schedules, schedule conflicts, or technical issues of participating users that have nothing to do with the host-server. Another technique is to interpret sentiment from text-based questions, identifying items like emoticons, tone of language, or sarcasm. However, these types of techniques, while evolving, are relatively unreliable in providing relevant and accurate sentiment analysis in an automated fashion. Accordingly, manual techniques are used to process the provided input. Such a manual process may have different problems (e.g., speed and/or human errors).

Another possible technique is to use polls and surveys of the audience. Such prompting can yield useful data. However, the results may depend on the question being asked (e.g., the same general question being asked in different ways) and/or a spectrum of presented answers. Even with such information, the results may only represent a snapshot of audience response to that question at a particular time. Further, to perform repeated surveys asking similar questions throughout an event can be cumbersome for moderators and annoying to participants.

In view of these and other problems, there exists a need for technical improvements in this field so that audiences can engage (e.g., provide sentiment feedback) with event organizers in new and interesting ways.

SUMMARY

Certain example embodiments provide a rating-system that allows participants in an audience of a webcasted event to express their opinions (e.g., sentiment) in single time-slices. The provided opinion feedback from the audience is combined with back-end computer processing to interpret and/or normalize the responses. In certain examples, such a rating-system may offer live and after-the-fact reporting that shows the sentiment of an audience throughout an event.

In certain examples, a system may give clients a real-time and post-event measure of audience sentiment throughout streaming of a media event. As used herein, media events include various presentations that are provided by an organization or individual. For example, media events may include a shareholder meeting event, an analyst day event, a product release conference, a press event, and the like. Such a system may provide so-called "Enterprise Webcasting" that may be used for meetings, town-halls, IR (investor relations) updates, and analyst presentations that are provided as webcasted content over a network such as the Internet.

In certain example embodiments, all event participants begin at a neutral opinion-state. When a participant clicks on a thumbs-up/thumbs-down button (e.g., to register a degree (1×, 2×, etc) of their opinion-state) a vote is sent to the sentiment analysis system. Certain example embodiments may add a time-correction to allot for the time that a user needs to click these buttons.

On the sentiment analysis system, the vote, degree of the vote, number of prior votes from a internet protocol (IP) address, and number of votes from the overall audience within a time slice (e.g., the current time slice) are synthesized, and a graph and live-total for sentiment are adjusted accordingly. A computer based algorithm normalizes and/or standardizes audience sentiment votes and adjusts graphs and metrics according to changes in audience sentiment. This is a dynamic process (both within each time slice, and in time slices that are strung-together) and constantly updated throughout a webcasted event. After a set period, the opinion states (e.g., a sentiment value) for audience participants are returned to neutral until another participant (or the same one) presses a thumbs-up/thumbs-down button again, at which point the above process repeats.

In certain examples, while the event is webcasted, clients can log into an event console and view live sentiment metrics (e.g., how high is audience participation in providing sentiment feedback) related to the current sentiment percentage and total vote activity as of that point in the event. Accordingly, the sentiment in an event (e.g., the sentiment of the audience of the event as a whole) is a metric that can evolve and change as the event unfolds.

After the event, clients can log into an event console and view event-wide sentiment metrics, along with a graph. In certain examples, the graph is also overlaid with a video player to allow clients to access and view specific clips in the context of the changes in sentiment.

Certain examples give the audience a chance to let their voice be heard (via sentiment feedback systems) and incentivize audience participants to engage in the webcast (e.g., more than a one-way presentation). Presenters may be provided with valuable real-time (or event-time—while the event is being webcasted) insights because they are invested in the audience's feedback—such as shareholder meetings, analyst presentations, employee meetings, etc. Certain users (e.g., those authorized to do so) may be able to see real-time sentiment during an event, or as a trend over time after the event so that they can determine messaging impact, key points, and audience reaction accordingly—before resulting articles (e.g., in a newspaper) are produced. In other words, event organizers (companies, people, etc) may adjust messaging, during an event, so as to enhance the messaging of the event (or future events).

Clients can drill down to specific points in a webcast and see/hear the clips where sentiment moved upward or downward. This can allow a granular extraction of sentiment-to-messaging.

In certain example embodiments, a method of tracking sentiment of an audience of a webcasted event is provided. Media content is transmitted to a client (e.g., a user and/or a computing device of the user) and sentiment input (from a member of the audience) is received from the client. Multiple sentiment expressions provided by members of the audience for the webcasted event are aggregated. Based on the aggregated expressions a sentiment value is calculated. In certain examples, a sentiment value is a range (e.g., 50 to 60 on a scale of 1 to 100). In certain example embodiments, the scale may be a range between −100% and 100% with 0 as a "neutral" state. Other types of scales (e.g., linear or non-linear) may also be used. The resulting calculated sentiment value is then output via the sentiment analysis computing system.

In certain example embodiments, a non-transitory computer readable medium is provided. A first plurality of participant sentiments within a time slice is obtained. The obtained participant sentiment inputs are validated. A sentiment value is calculated based on a plurality of sentiment votes for the time slice. For the calculation, the votes are normalized against each other within the time slice and normalized against other votes for the same client identifier that are outside the time slice. A graphical display is then output based on the calculation.

In certain example embodiments, a sentiment analysis system is provided where sentiment inputs are received from an audience of a webcasted event and stored to a storage medium. A time slice is determined and from among the stored inputs a plurality of valid inputs is obtained. Each of the validated inputs is adjusted based on overall sentiment participation within the determined time slice and other sentiment inputs of the same client outside the time slice. A sentiment value is calculated and a sentiment analysis presentation is output based on the sentiment value.

In certain example embodiments, a graphical presentation of audience sentiment is output with a webcasted stream of an event. A graphical time slice indictor indicates at least one of a plurality of time slices of the event on the graphical presentation and is synchronized with the currently displayed part of the webcast stream.

The features described herein may be combined to form additional embodiments and sub-elements of certain embodiments may form yet further embodiments.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION

Figure 1:
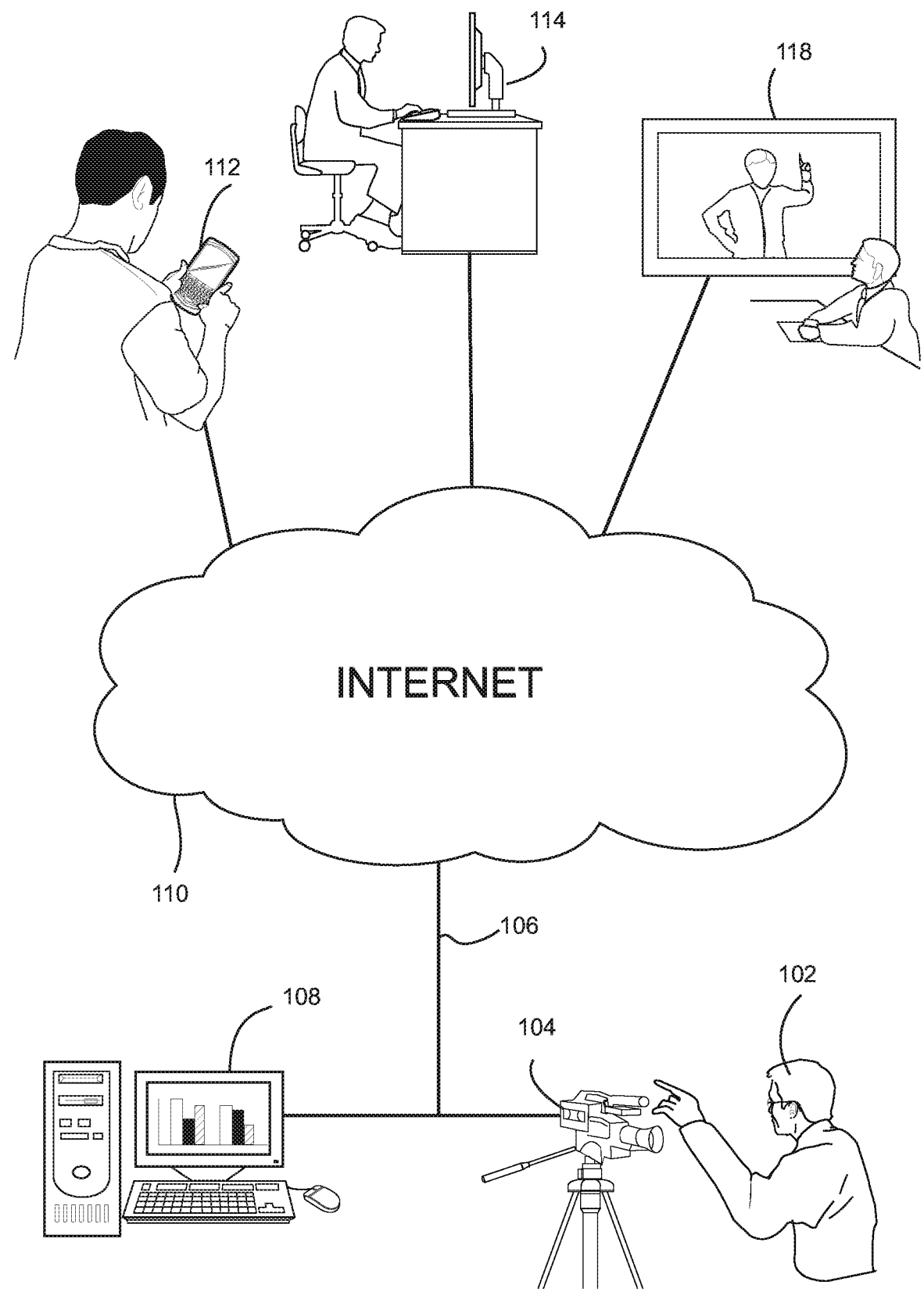
FIG. 1 illustrates streaming of a media event with example sentiment analysis according to certain example embodiments.

A rating-system interface, combined with a back-end client interface, and a computer system that is configured or programmed to interpret and normalize responses are provided. The system is configured to measure audience sentiment of a webcasted event in real-time (or substantially real-time—e.g., within seconds or minutes) or event-time (at a time during the initial webcast of the event) and provide outputs of the measured sentiment. Such outputs may be in the form of live graphs or reports (e.g., delivered via email) that include metrics highlighting sentiment throughout a webcasted event.

In certain example embodiments, a streaming media player with buttons (virtual or physical) is controlled by one or more audience members that are viewing an event. The buttons may include thumbs up/down, happy/sad faces, other types of user input options for audience members to express their sentiment while watching the event (e.g., a live event). In certain example embodiments, the buttons would allow up to X (e.g., greater than 0) number of clicks at one time to reflect varying degrees of sentiment—such as 2× up, 2× down, etc.

A back-end computer system to the sentiment analysis system provides administrators or other types of users with a back-end display that may showcase data collected during the event. Such displays may be restricted to certain types of users. For example, typical audience members of an event may not have access to such a display while other users do have access (e.g., users associated with the organization or person hosting the webcasted event).

A back-end computer system may provide different types of displays depending on when the user logs in. For example, when the event associated with the sentiment analysis is live, the user can view the sentiment activity in real-time through a series of displays and processing analytics (e.g., statistics). However, once an event has concluded, the client can view completed charts, along with a media player overlay that provides a video or audio clip that corresponds to a specific time slice indicated on a sentiment graph.

Sentiment graphs, charts, metrics, etc can be provided through the back-end display and/or embedded into outbound email reports (e.g., generated after or during an event). In certain examples, the data available for output depends on when the client is viewing the information. For example, during a live event, metrics may include the current sentiment percent (0-100, positive and negative sentiments, etc), up/down trends (that may auto-refresh or update automatically), total clicks, and/or a total number of users that are voting. Once the event is completed, the data may include the above metrics along with the percentage of the audience that voted and the largest number of votes in a single time-slice (that may be dependent on an active time-slice filter). In certain example embodiments, a video of the event may be overlaid to allow a client—when they see sentiment trending upward or downward in their graph—to select a specific time-slice and replay just that specific audio and/or visual clip from the webcast.

In certain example embodiments, routines (e.g., algorithms) that provide sentiment analysis on a computer system may: 1) check incoming votes for a unique IP address; 2) compare votes to the percent of total audience voting (assuming non-voters are neutral); 3) check how many times an IP address voted in the event (this may be weighted); and 4) synthesize with other votes for calculation purposes. Special routines may be included to avoid radical swings in votes based on variable click-totals and varying click-velocity. In certain examples, click-states are managed such that each vote lasts for a limited number of seconds (e.g., 15), when the time is up, the participant's vote-state is reset to neutral.

FIG. 1 illustrates streaming of a media event with example sentiment analysis according to certain example embodiments. Here person 102 is giving a presentation that is recorded by camera 104. This video/audio recording is then transmitted to computing system 108, which encodes the recording in a format that is suitable for transmission over computer network 106. Some audience members may be connected to computer network 106. However, other audience members may access the webcast of the event via Internet 110.

Different types of computer devices may be used to access the stream of the webcasted event. Users may access via mobile device 112, a desktop computer system 114, and/or display 118 (e.g., a television). Such devices may provide an interface (explained in greater detail below) for audience members to provide sentiment feedback for the webcasted event.

In certain examples, an event may be webcasted to one computing device, but sentiment analysis may be provided from another device—one that is not receiving the webcasted event. For example, an event may be webcast to a display device 118 (e.g., a television). In conjunction with the webcast, users with other devices (e.g., mobile devices such as smart phones, laptops, tablets, etc) may register with the webcast so as to provide sentiment feedback. The feedback provided by these users may then be synchronized with the event that is being webcasted to the display. In other words, multiple users may view a streamed event on one display, but provide their own individualized sentiment feedback for the event through a personal computing device (mobile phone, tablet, laptop, etc).

When sentiment feedback is provided by users via their respective devices (e.g., 112, 114, and 118) it is transmitted back over the Internet 110 and computer network 106 to computer system 108. The sentiment feedback is then analyzed by specialized algorithms (described in greater detail herein) implemented on the computer system 108. While the example in FIG. 1 shows computer system 108 both transmitting the streamed event to the computing devices and receiving sentiment feedback, other implementations are contemplated where these tasks may be split between different computing systems.

The data stream from the webcasted event may be accessed via the Internet 110 by wired (e.g., Ethernet—802.3x), wireless connections (e.g., 802.11x, cellular, etc), and/or a combination thereof. For example, mobile device 112 may be connected to the Internet via a wireless connection and desktop computer 114 may be connected via a wire connection. Responsive sentiment feedback may be then be transmitted over the respective wired and/or wireless connections.

In certain example embodiments, the transmission of the webcast may be a recording (e.g., not live). In such an instance, the recorded webcast may be synchronized with a sentiment information display that reflects the sentiment of the audience that previously viewed the live webcasting of the event.

Figure 2:
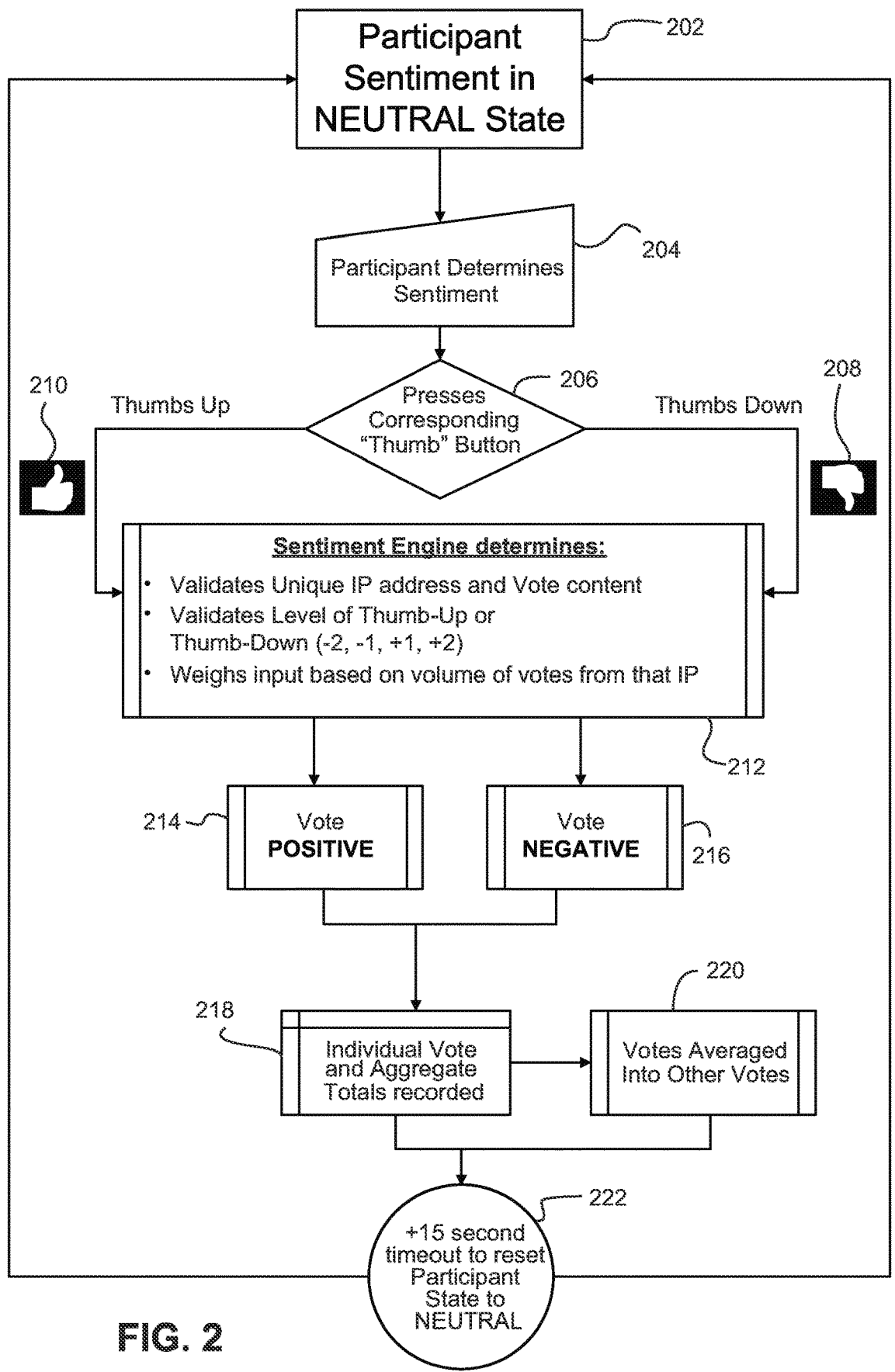
FIG. 2 is a flow chart showing an example process for analyzing provided sentiment information of an event.

FIG. 2 is a flow chart showing an example process for analyzing provided sentiment information of an event. In step 202, by default, all event participants that are viewing a webcasted event begin at a neutral opinion-state.

In step 204, the customer (e.g., member of the audience) reacts to watching and/or listening to the webcasted event. In accordance with his/her reaction, in step 206, the customer presses or triggers a button that corresponds to their reaction. In this embodiment, the button may be either a thumbs up button 210 (corresponding to positive sentiment) or a thumbs down button 208 (corresponding to negative sentiment). A result of the audience member pressing a button is then transmitted to a sentiment engine computer system for further storage and/or analysis.

In step 212, the sentiment engine: 1) validates that the IP address of an incoming sentiment vote is unique (for a given time slice) and stores and/or determines the content of the vote; 2) validates a level associated with the incoming sentiment vote (e.g., −2, −1, 1, or 2); and 3) weighs the sentiment vote against other sentiment votes from the unique IP address. In certain example embodiments, other types of unique identifiers may be used to associate a sentiment vote with an audience member or organization. For example, the vote may be associated with a username, MAC address, or other type of identifier that identifies the user (or computing device) that is submitting the vote.

In certain example embodiments, the incoming vote is also associated with a certain time delay factor (e.g., 1, 5, or 15 seconds). Specifically, example sentiment analysis systems may adjust the time that a sentiment vote is received because of a natural delay in the amount of time it may take a user to have a reaction to content in the webcast (e.g., a CEO discussing that layoffs will occur or that bonuses will be doubled this year). Such a delay factor (e.g., variable) may then be used to improve synchronization between the received sentiment votes and the actions of the event that is being webcasted. The delay factor may be implemented in various ways. For example, each user may be assigned their own individual delay factor. In another example, the delay factor may be programmatically updated using heuristics or the like. In yet another example, a universal delay factor is set for all sentiment votes. Thus, a sentiment vote that has a timestamp of 8:45:15 (or other time based value) and a delay factor of 15 seconds may be associated with time value 8:45:00. In certain example embodiments, the delay factor may be varied based on the latency and/or bandwidth of participants. For example, a user on high latency connection may have a larger delay factor (e.g., a satellite connection) than a user on faster connection (e.g., watching the webcast over a corporate network).

After the above validation and weighting in step 212, the system then registers the received vote as a positive vote (step 214) or a negative vote (step 216) depending on the earlier provided thumbs up thumbs down. In step 218, the individual votes are recorded and aggregate totals are calculated and/or recorded. In step 220, the received vote(s) are averaged into other received votes (e.g., to determine an overall sentiment value).

In step 222, the processor loops for 15 seconds (from receiving the initial vote—e.g., step 206) before resetting the audience participant state and returning to step 202 where the state is again set to neutral. In certain example embodiments, the 15 second value may act to create "time-slices" of an event that is being webcast. It will be appreciated that time values other than 15 seconds may be used. For example 5 second, 1 minute, or 5 minutes. Indeed, in certain example embodiments and administrator of a sentiment analysis system may dynamically (or initially) set the time value based on institutional needs.

Figure 3:
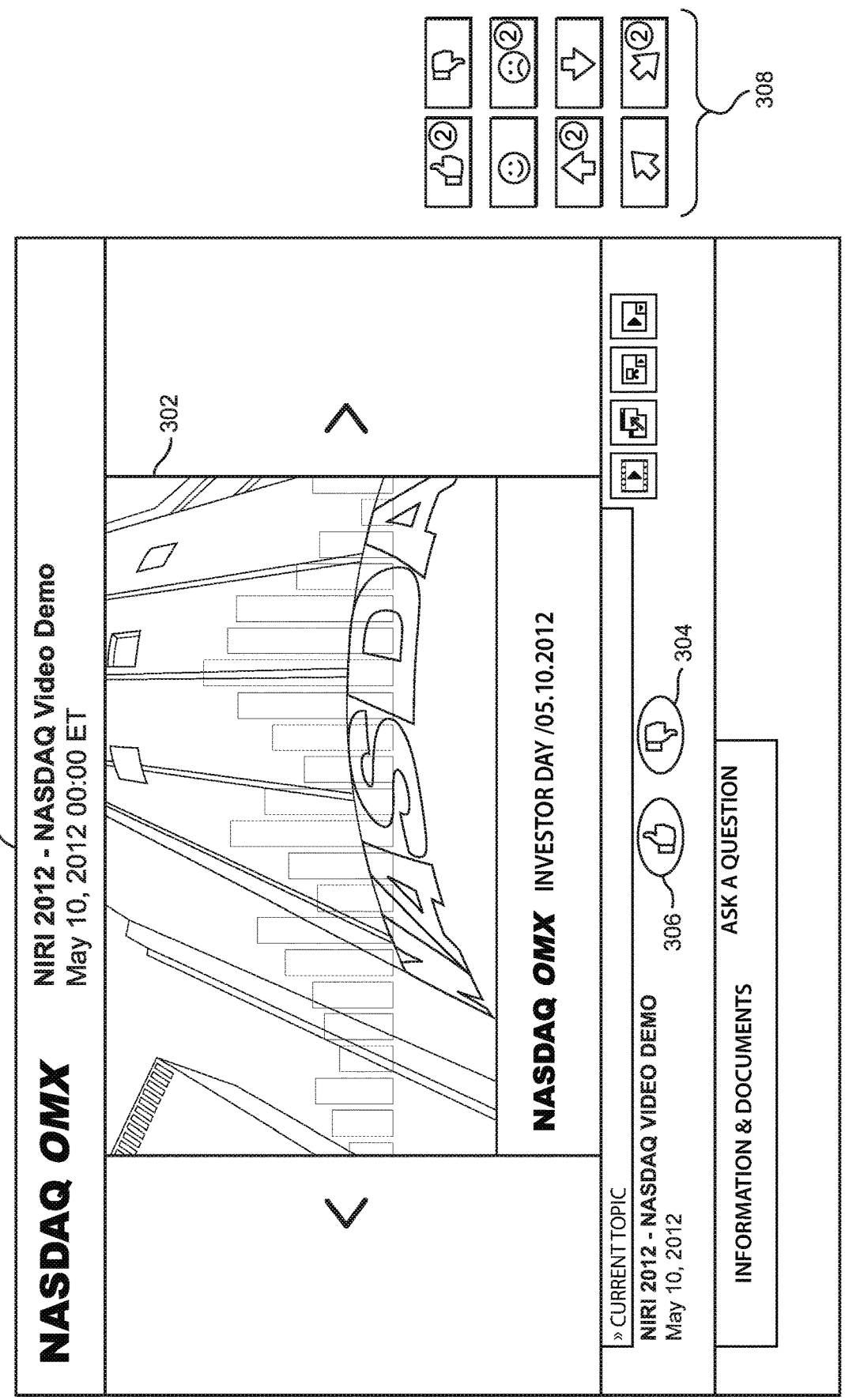
FIG. 3 is an example display of a webcasted event that includes sentiment analysis input controls.

FIG. 3 is an example display of a webcasted event that includes sentiment analysis input controls. Screen 300 is a display screen of a computing device that is displayed to an audience member of a webcasted event ("Nasdaq OMX Investor Day"). The webcasted event is visually shown in window 302 of the screen 300. As the event progress and the screen is updated, an audience member may activate button 304 (thumb down) and/or 306 (thumb up) in order to provide their sentiment at a particular time of the event. As explained herein, this sentiment indication is transmitted to a system for further analysis.

Graphical indicators 308 are alternative user interface elements that may be provided to screen 300 to allow users to provide feedback of a webcasted event. For example, happy/sad faces, up/down arrows, or up/down pointing arrows may be used. In certain example embodiments, when a user presses a button multiple times within time frame (e.g., that may be associated with the time slice value described herein), the button may indicate how many times the user has activated the button. This numerical indication may inform the user of the "degree" of their vote for a given time frame.

Other types of graphical elements may be included in the screen 300. For example, previous sentiment votes, total sentiment votes for a given time slice, the calculated sentiment indicator, a moving average of the sentiment value, and the like may be displayed to the user. This information may be transmitted from the sentiment analysis system to the computing device of an audience member.

Figure 4:
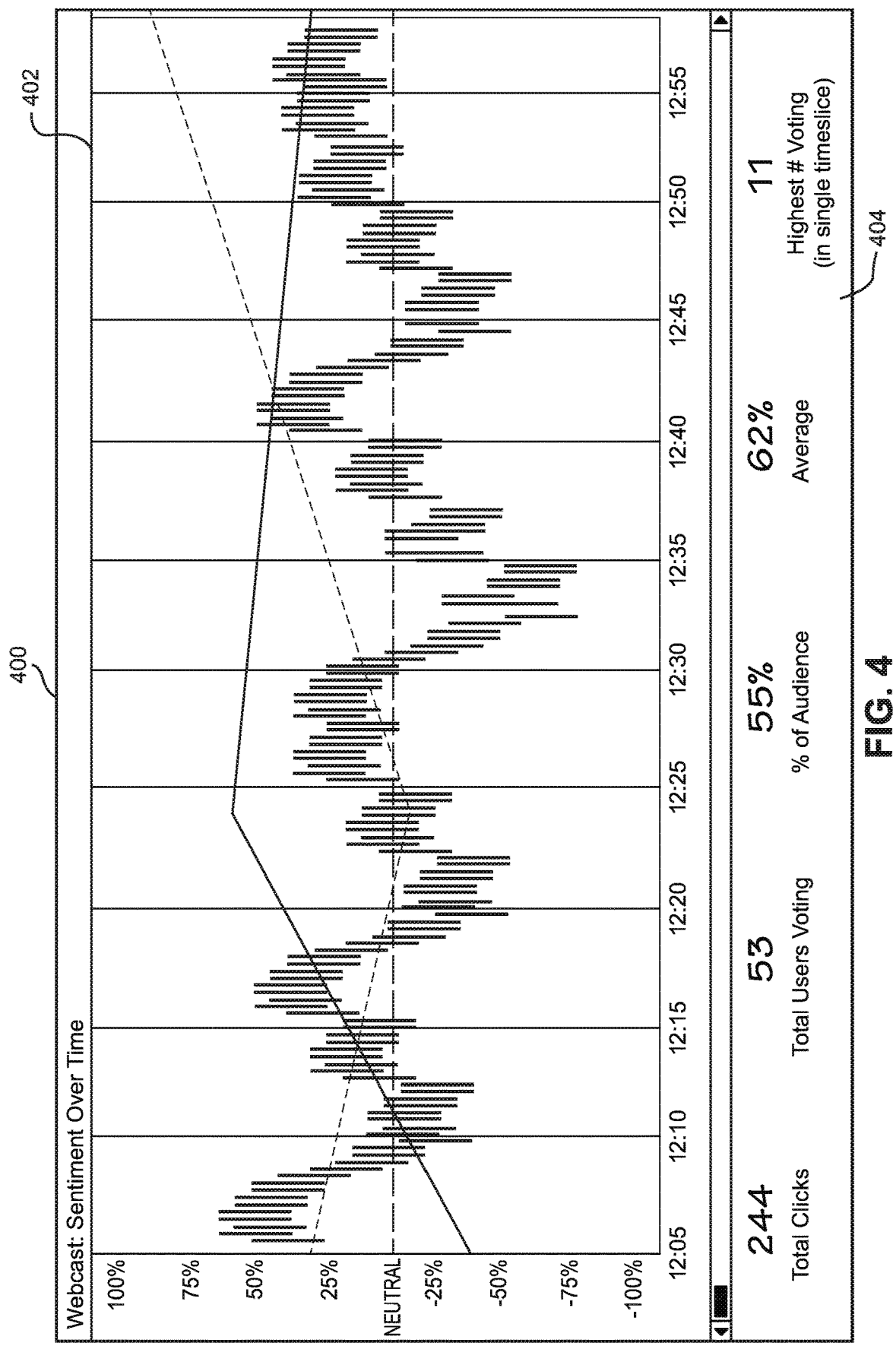
FIG. 4 is an example graphical display of sentiment provided by users during an event.

FIG. 4 is an example graphical display of sentiment provided by users during an event. The graphical display 400 includes a sentiment over time graph 402 of the webcasted event. Here, each of the vertical lines may correspond to a given time slice (e.g., 15 or 30 seconds, or 1 minute). Further, the graph may be updated in real-time as new sentiment votes are received from audience members. The graph may also include different types of moving averages or other calculated values. For example, a moving average (e.g., 5 minutes) of the sentiment values may be displayed. In certain examples, a moving average of voter participation may also be displayed.

In addition to the graph 402, the display 400 may also include a display summary 404. Here, the total number of clicks (total votes received), the total number of users voting, overall audience participation (e.g., those who have voted at least once), the average sentiment of the audience to the current point in the webcast (e.g., between 100% (positive) and −100% (negative)), and/or the highest number of votes in a single time slice may be displayed. It will be appreciated that other types of information may be displayed to users for their consumption.

Figure 5:
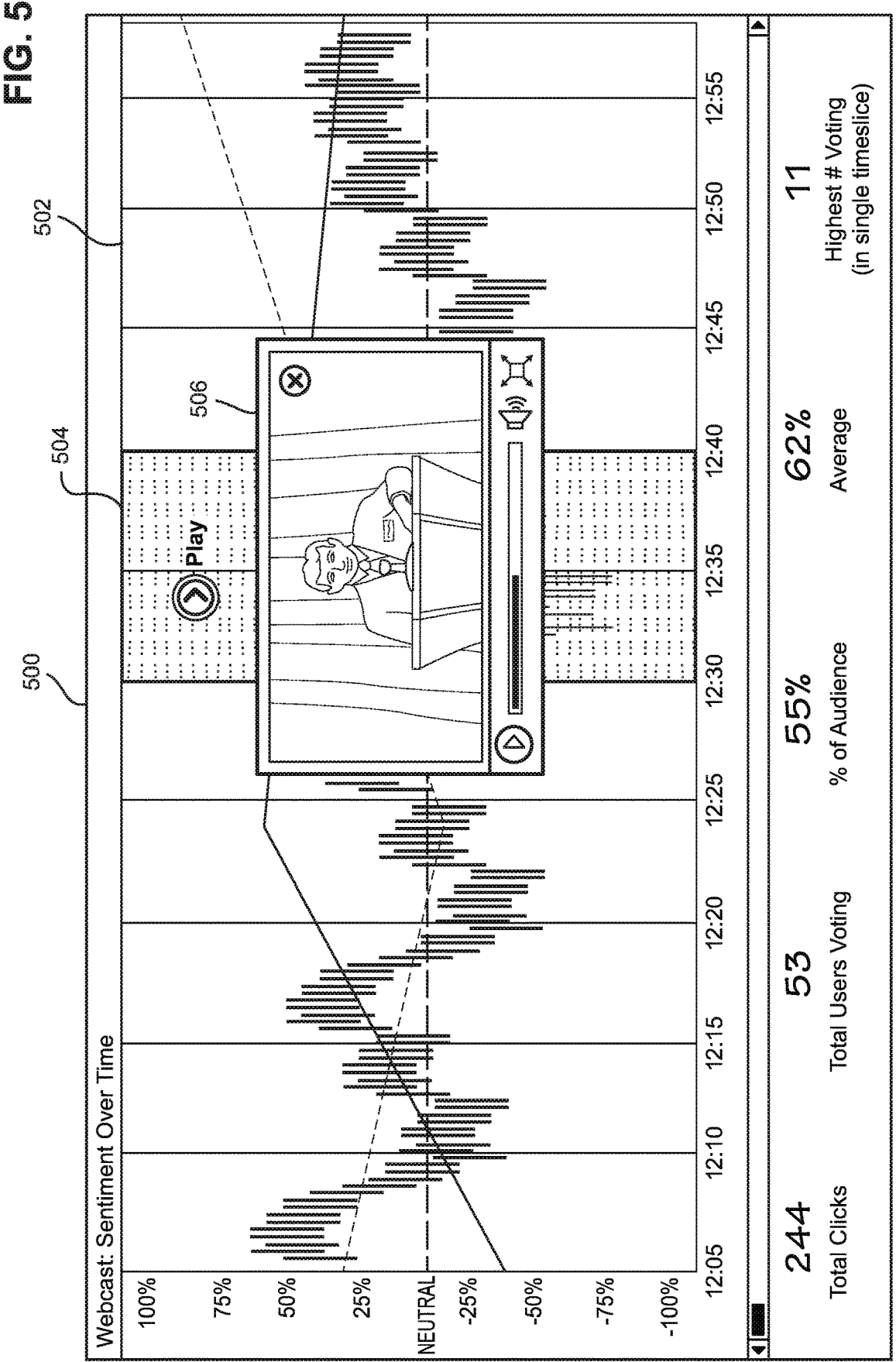
FIG. 5 is an example display of a webcasted event and sentiment analysis results.

FIG. 5 is an example display of a webcasted event and sentiment analysis results. Graphical display 500 includes a graph 502 that may be similar to the graph in FIG. 4. In this graph, however, the webcasted event 506 is displayed (in a video application) over the graph 502 and is a replay (not live) version of the event. Additionally, the segment of the recorded webcasted event that is displayed in 506 is synchronized with a highlighted segment 504 of graph 502. Accordingly, a user may jump to different portions of a webcasted event and the corresponding sentiment associated with that portion may be highlighted on the graph. Similarly, a user may click or navigate to a particular portion of the graph and have the video of the webcasted event automatically updated to the portion of the event that corresponds to the selected portion of the graph. With such an implementation users may be able to determine what portions of an event achieved negative or positive reaction.

Figure 6:
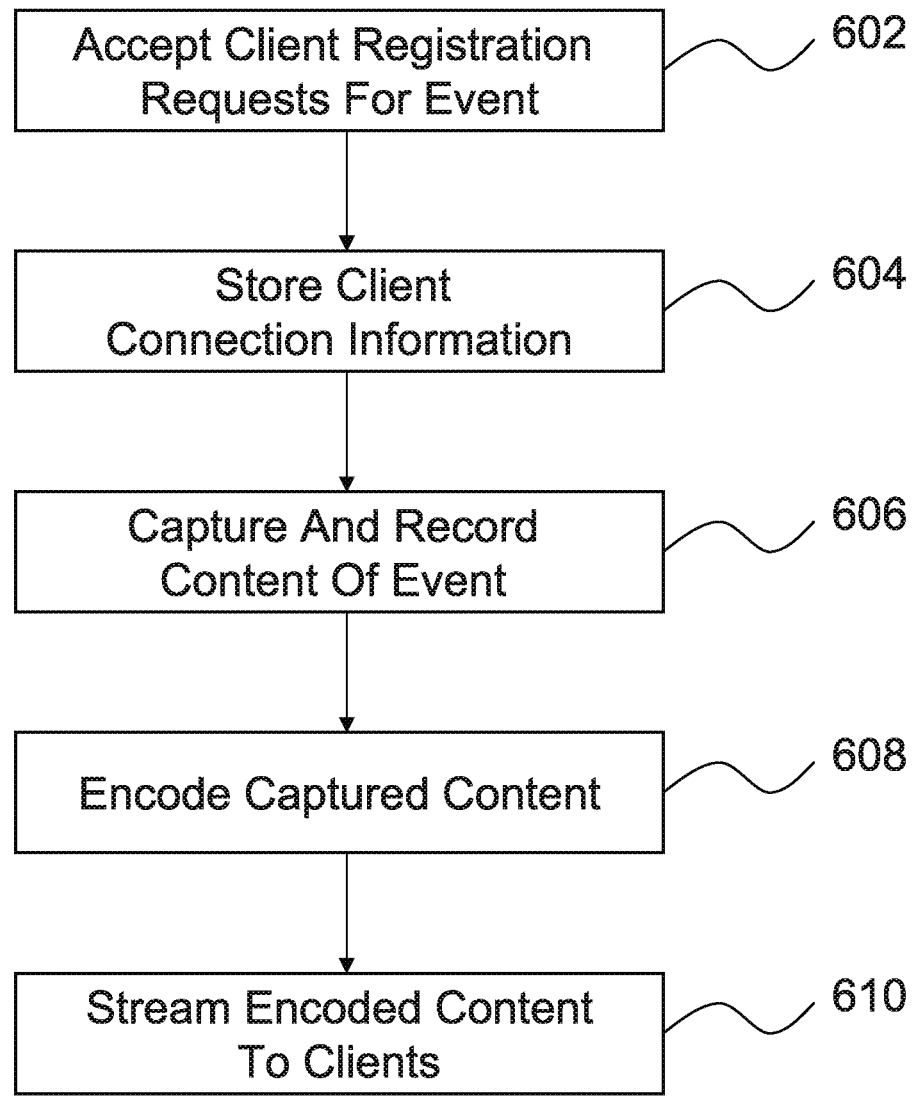
FIG. 6 is a flow chart of an example process for initializing a webcasted event with sentiment feedback.

FIG. 6 is a flow chart of an example process for initializing a webcasted event with sentiment feedback. In step 602, a computer system accepts client registration requests for an event that is to be webcasted (or is being webcasted). The registration process may include entry of a user name and password combination or the like. In certain instances, the registration process may be integrated into receiving sentiment feedback by simply storing the MAC or IP address of the device associated with the audience member. In step 604, the accepted registration information is then stored in a database of the sentiment analysis system.

In step 606, the event that is the subject of the webcast is captured (e.g., via a video camera and/or audio recorder) and recorded. In step 608 the captured signal is processed by a computing system and the received data stream is encoded in a format that is suitable for a webcasting (e.g., one that is suitable for transmission over the Internet). In step 610, the encoded stream is webcasted to users that have registered with the system.

In certain instances, multiple encodings may be performed so as to provide multiple webcast streams to different types of audience members. For example, audience members that receive a webcast over a wireless connection (e.g., 3G) may have a relatively low quality and compressed format of the event. In contrast, audience members with a faster connection (e.g., wired) may receive a high quality format that requires more bandwidth to effectively operate.

As will be appreciated by those skilled in the art, transmitting content over the Internet (or even private networks in certain cases) can sometimes result in poor network performance. Viewing a streaming video of an event under such conditions can result in poor performance and/or quality of the video. In certain instances, the video player on the client that is receiving the video will "buffer" so that the overall quality of the video is the same (or nearly so) for the duration of the webcast. In other cases, the video quality may be decreased to maintain a constant presentation of the event.

In the case of buffering, the provision of sentiment input to a central server may be affected because the portion of the event being displayed on the user's device is not in time synchronization with the transmitted webcast. Accordingly, the delay factor mentioned herein may also take into account the buffering of the webcast on the client's device. For example, if buffering occurs on multiple occasions, the delay factor may gradually increase over the course of the webcasted event. Thus, the delay factor may be different for different audience members depending on how much (if at all) the webcast is buffered on their computing device. In certain example embodiments, a user may be assigned an initial delay factor that is based on their connection speed.

Figure 7:
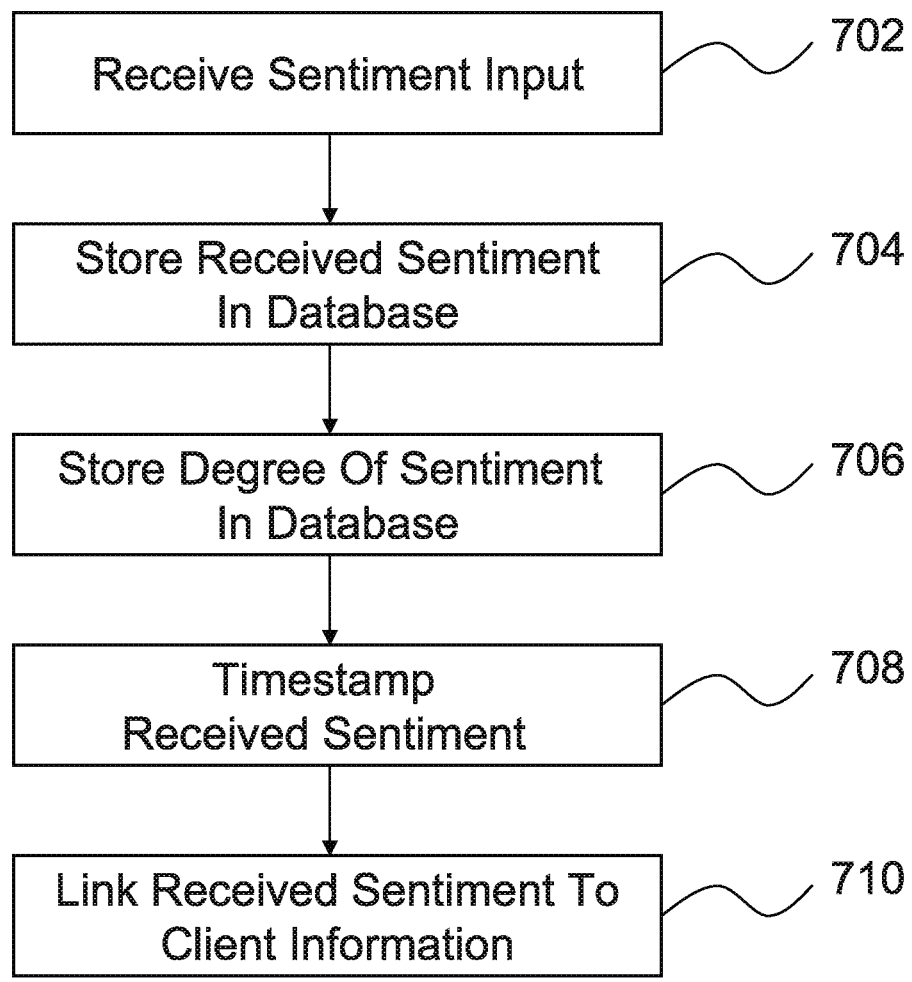
FIG. 7 is a flow chart of an example process for receiving user provided sentiment.

FIG. 7 is a flow chart of an example process for receiving user provided sentiment at a sentiment analysis system. While viewing the webcasted event an audience member provides sentiment input that is transmitted and received by the sentiment analysis system in step 702. Subsequently, in step 704, the received sentiment input is stored in a database. In step 706, the severity of the sentiment input is stored (if provided by the user). In step 708, a timestamp is also stored in the database and associated with the stored sentiment information. In certain instances, a timestamp is when the data is inserted into a database, in other examples the timestamp is initially provided by the client in correspondence with the provided sentiment input. The timestamp value may be a time associated with the run time of the event (e.g., since the start of the event), an absolute time (e.g., date & time), or some other incrementing value that may be associated with time (e.g., number of seconds since the sentiment analysis system started running). In certain example embodiments, a recorded timestamp is used for de-duplicating inputs (e.g., if a user votes more than once in the current time slice).

In step 710, the received sentiment information is linked to the client information from which the sentiment was received. Such client information may be the IP address from which the sentiment information was received, or may be a user or client identifier. In certain example embodiments, a client may be a computing device (e.g., mobile phone, tablet, etc) that is associated with an identifier (e.g., MAC or IP address) or may be an audience member (e.g., username).

It will be appreciated that other types of information may also be stored with the received sentiment response. For example, a time delay value may also be stored for each received sentiment vote. Such a time delay value may then be used to "adjust" the timestamp associated with the given sentiment vote so as to more accurately reflect the user's sentiment of the webcasted event. In certain example embodiments, a time slice value may also be stored with the received sentiment vote. Specifically, an event may be divided into multiple time slices where the receiving sentiment is associated with one of those time slices (e.g., because it falls within the time slice).

Figure 8A:
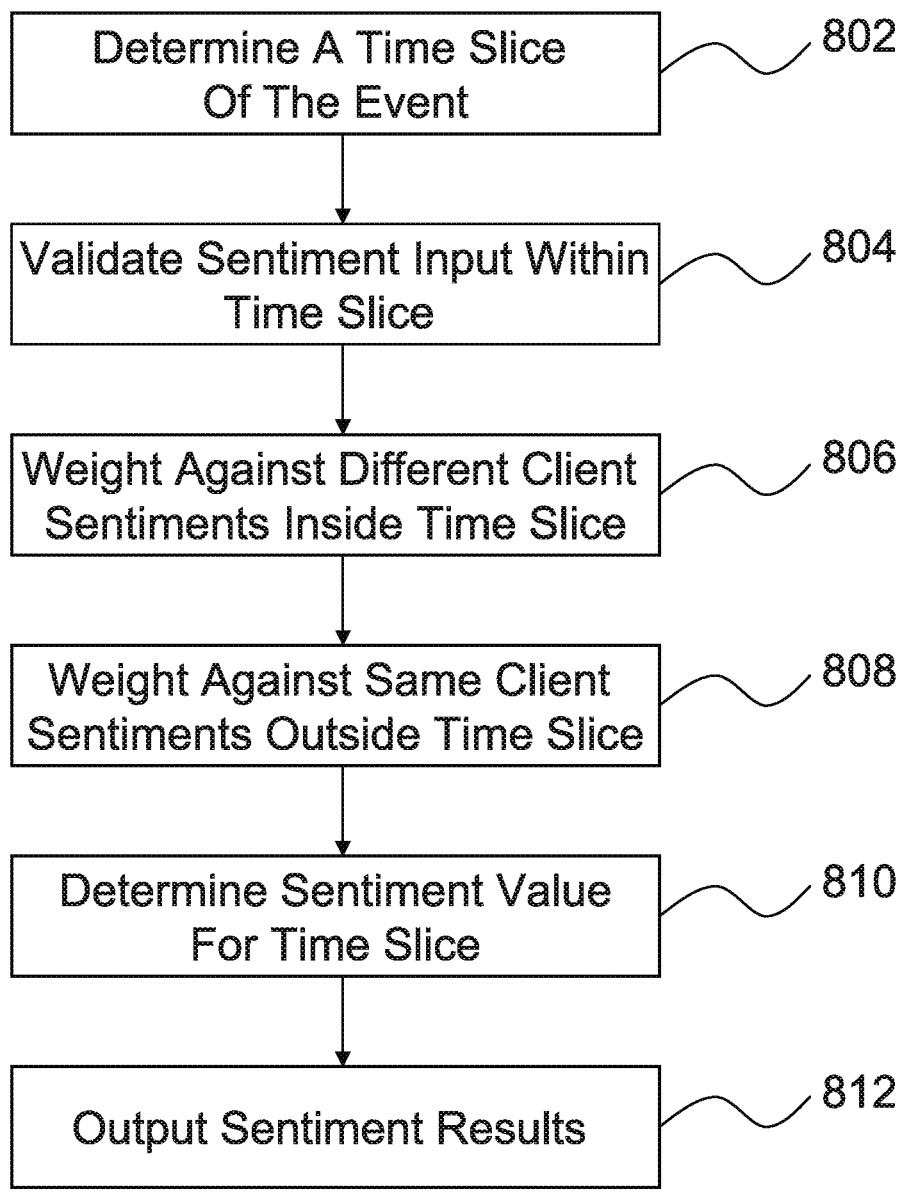
FIG. 8A is a flow chart of an example process for providing sentiment analysis results based on provided audience sentiment according to certain example embodiments.

FIG. 8A is a flow chart of an example process for providing sentiment analysis results based on provided audience sentiment. In step 802, a time slice of the event is determined. In certain example embodiments, the time slices may be the same length throughout the webcast (e.g., each is 15 seconds). In other examples, the time slices may correspond to particular topics or subjects that are being discussed opposed to a set length of time. For example, if the subject of a webcast is a slideshow presentation, a time slice value may be linked to presentation of that subject (e.g., the difference between switching to a slide of the slide show to switching from the same slide to the next slide of the slideshow). Thus, one time slice may be 2 minutes and another may be 15 seconds. In certain examples, a user may change the time slice value. For example, sentiment analysis may be performed with a time slice value of 15 seconds and another with 30 seconds. Such variations in the time slice values may affect the final sentiment results for the time slices.

In step 804, sentiment input that is determined to be within the time slice is validated. Validation of sentiment input may include verifying that only one sentiment input from a given client is included within the determined time slice. Various techniques for selecting "one" input may be employed. For example, when there is more than one input, one of the multiple inputs may be selected at random (or pseudo randomly). Alternatively, the first (in time) sentiment input may be used. In certain examples, the sentiment inputs within the time slice may be combined. For example, all of the sentiment inputs may be averaged (e.g., one positive and one negative would be zero or two positive votes would be one positive) or the votes may be added to each other (e.g., two single positive sentiment inputs become one 2× intensity sentiment vote).

In certain example embodiments, the number of sentiment inputs per client that may be used within a time slice may be dynamically changed by a user of the sentiment analysis system (e.g., an administrator). For example, an administrator may set the system so that two sentiment votes per time slice per client may be used in the overall sentiment analysis.

In step 806, each sentiment input within the time slice is weighted against other sentiment inputs from different clients. In certain example embodiments, the number of sentiment votes within a time slice is also weighted against the total number of audience members. Accordingly, for example, if one positive sentiment vote is received for a time slice when there are 100 audience members, the resulting sentiment value (on a scale of 0 to 100, with 50 being neutral) may be in the low 50s. As noted above, other scales are possible (e.g., with 0 being neutral).

In certain instances, a sentiment range is calculated. For example, the range of sentiment may be inversely proportional to the percentage of the audience that voted (e.g., more votes leads to a narrower sentiment range) and/or based on the variation in votes (e.g., if there are 25 negative sentiment votes and 25 positive sentiment votes, the sentiment range may be very large). Thus, if 100 out of 100 audience members vote and all the votes are positive, the range may be very small (or their may be no range in this case). In certain examples, the degree of an audience members vote may also be a factor in the sentiment value for a time slice.

In step 808, the sentiment input for each client is weighted against other sentiment input for that same client that is outside of the time slice. For example, clients with more sentiment votes may be weighted less than those who are voting for the first time. In other examples, clients who vote more may be weighted more (e.g., because they may be paying more attention or are presumed to be more engaged).

In certain instances, the comparison, weighting, or adjustment of sentiment votes may be based on sentiment input provided from an earlier time of the webcasted event. Additionally, or alternatively, a comparison may include sentiment that has been provided "after" the sentiment input for the current time slice. In other words, sentiment analysis may be performed in "real-time" as the event is being webcasted or may be performed after the event is over. In the former case, only previously provided sentiment may affect the calculation of sentiment of the current time slice. In the later case, all of a client's sentiment (whether before or after the current time slice) may form the basis for determination of the sentiment of the current time slice. It will be appreciated that the resulting comparison or weighting may be affected by whether the sentiment analysis is performed in real-time with the event (e.g., is based only on previously provided sentiment) or is performed after the fact. Accordingly, the final resulting sentiment value or range of sentiment may be affected based on when (real-time or after the fact) the sentiment analysis is performed.

In step 810, the sentiment value for the time slice is determined and/or calculated. This determination and/or calculation may include combining the two weighted sentiment values for each of the clients and then taking an average for the combined weighted sentiment values to determine a sentiment value (or range) for the time slice that was determined in step 802. In certain instances, a result of the weighting may be multiple weighted sentiment values that may then be averaged to determine a range and or individual value. In certain example embodiments, the weighting may be a normalization where the raw sentiment votes are normalized (e.g., based on the above factors). The resulting normalized votes may then be aggregated and/or averaged. Accordingly, the raw sentiment votes/input may be adjusted to obtain a resulting calculated range or sentiment value.

In step 812, the sentiment results are output. The type of output that is performed may vary according to user preferences. In certain instances, the result may be part of a report that is emailed to certain individuals. In certain instances, the output is part of an overall graphical display that is provided in real-time while the event is webcasted (e.g., as shown in FIG. 4). In certain examples, the determined sentiment result is simply output (e.g., stored) to a database.

It will be appreciated that the order of the steps in FIG. 8 may be adjusted. For example, steps 808 and 806 may be switched (or optional) according to certain example embodiments. Thus, each of the sentiment votes may be weighted (per step 808) and then the result of that weighting may be used for the weighting in step 806. In certain examples, the weighting steps may be removed or adjusted where the raw sentiment input is averaged and/or aggregated.

Figure 8B:
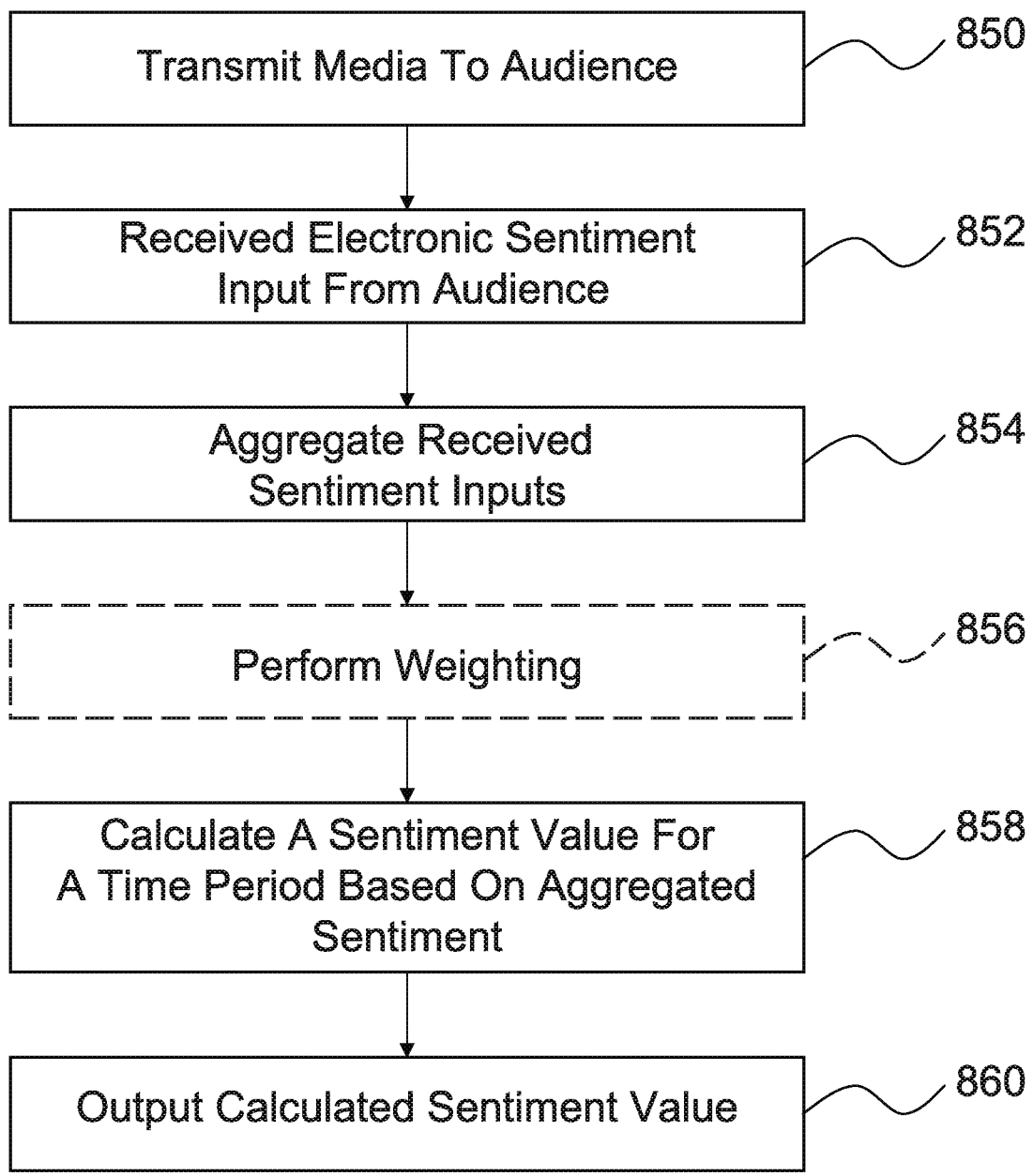
FIG. 8B is a flow chart of an example process for providing sentiment analysis results based on provided audience sentiment according to certain example embodiments.

FIG. 8B is a flow chart of an example process for providing sentiment analysis results based on provided audience sentiment according to certain example embodiments. In step 850 media is transmitted to an audience. In certain examples, the transmission is performed via webcasting over the Internet.

In response to transmitting the media to the audience, electronic sentiment input is received from the audience in step 852. This information includes, for example, an audience member's negative or positive reaction to a portion of a webcasted event.

The received electronic sentiment is aggregated in step 854. For example, an audience member's negative sentiment is aggregated with two other members who had positive sentiment reactions. The aggregation may include one or more techniques described herein. For example, the received sentiment input may be adjusted based on the number of sentiment inputs over a given time period, the size of the audience during a period time, or by how many times an audience member has provided sentiment. Thus, in certain examples, an optional step 856 of weighting the received input may also be performed.

In step 858, a sentiment value is calculated for a time period based on the aggregated sentiment inputs. The calculated sentiment value is then output in step 860.

Figure 9:
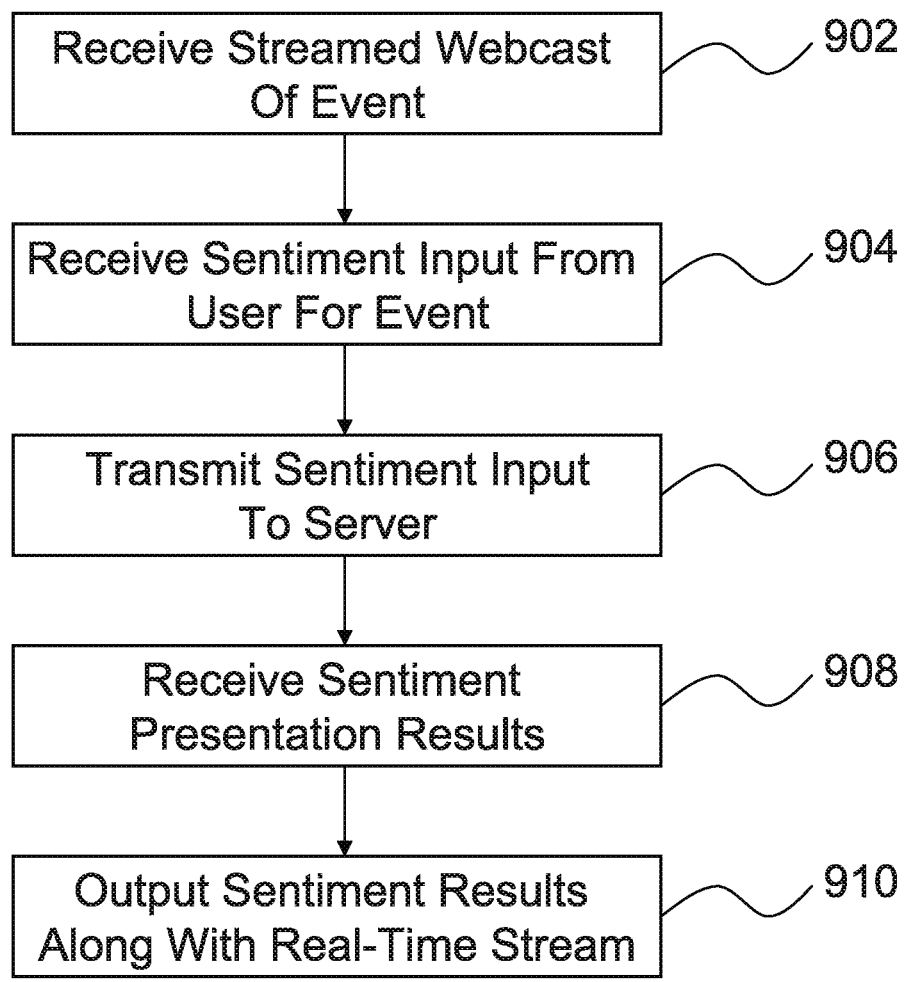
FIG. 9 is a flow chart of a user providing sentiment feedback from a webcasted event.

FIG. 9 is a flow chart of a user providing sentiment feedback for a webcasted event. This example process may be implemented and/or carried out on a client computing device (mobile phone, tablet, laptop, etc) where, in step 902, the data stream of the webcasted event is received on the device and displayed to the user.

In step 904, the user provides sentiment input in response to viewing and/or listening to the streamed webcasted event. As part of inputting sentiment, a user may also select or indicate an "intensity" of their sentiment. In certain instances, votes with a higher intensity may count more towards the final sentiment determination for a particular time slice (e.g., 1.5× more, 2× more, etc). In certain examples, users may set the intensity of their sentiment by hitting/activating a button twice (e.g., double clicking), selecting another button (e.g., a 2× intensity button), adjust a slider or dial, or via other user interface techniques.

As noted above, the streamed webcast may be received on one computing device (e.g., television, desktop computer) and sentiment input transmitted through another computing device (e.g., a tablet computer). In other words, multiple users may share a display, but each may provide their own sentiment for the event (by their respective individual computing devices).

In any event, the user provided sentiment is transmitted to a server in step 906 for further sentiment analysis. As a result of this analysis, in step 908, sentiment presentation results are received and output along with the real-time webcasted stream in step 910. Accordingly, users may view real-time sentiment of a webcasted event. In certain examples, a client may also display where their individual sentiment is with respect to the "total" sentiment.

In certain example embodiments, the real-time sentiment display may only be provided to certain users and/or clients. For example, managers or other senior level positions within a company may view sentiment in real-time (e.g., as the event it still be webcasted)

Figure 10:
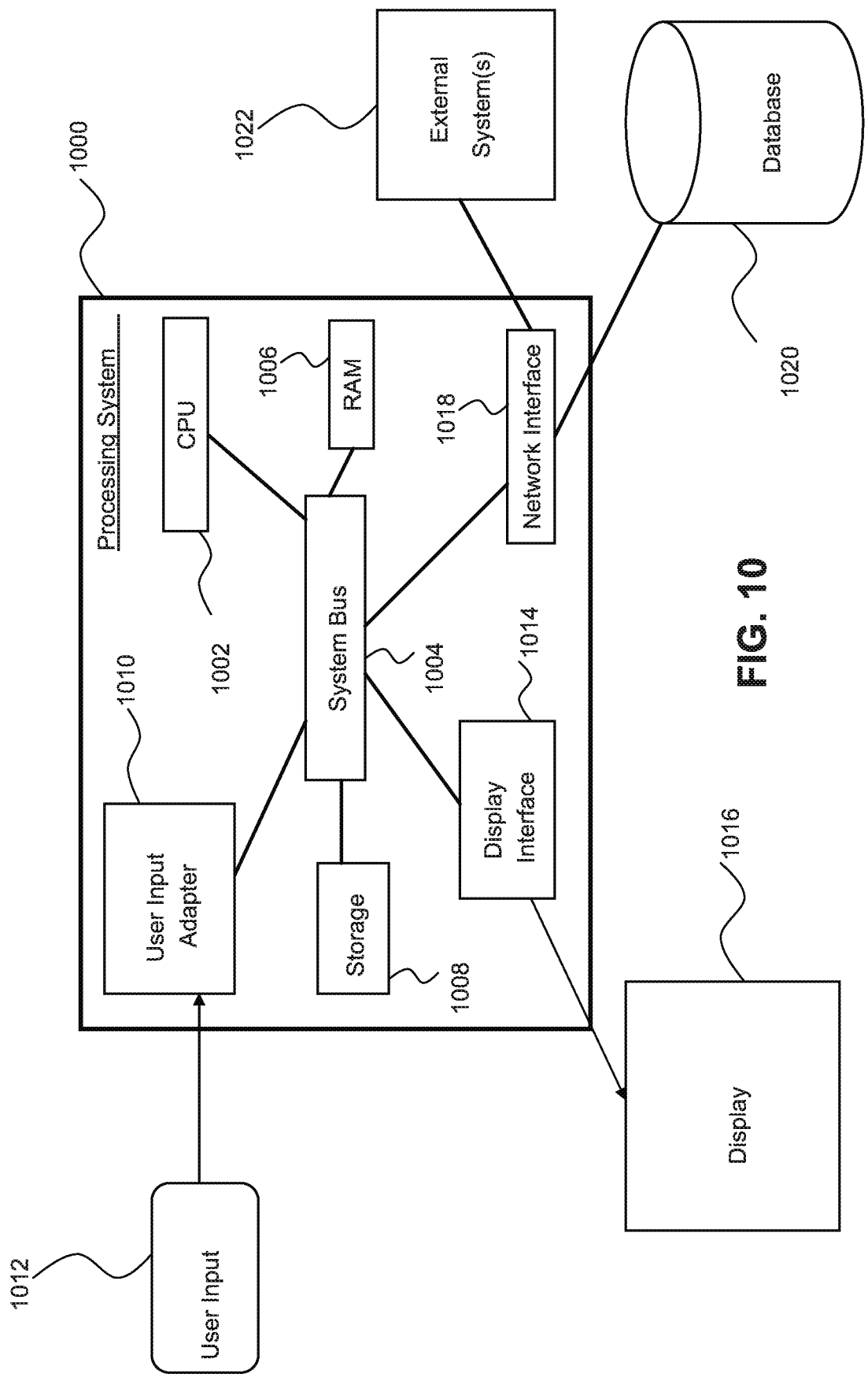
FIG. 10 is a block diagram of an exemplary computing system according to certain example embodiments.

FIG. 10 is a block diagram of an example computing system according to certain example embodiments. A processing system 1000 includes a central processing unit or CPU 1002, a system bus 1004 that communicates with RAM 1006, and storage 1008. The storage 1008 can be magnetic, flash based (e.g., for a mobile client device), solid state, or other storage technology. The system bus 1004 communicates with user input adapter 1010 (e.g., a PS/2, USB interface, or the like) that allows users in input commands to processing system 1000 via a user input device 1012 (e.g., a keyboard, mouse, touch panel, or the like). The results of the processing may be displayed to a user on a display 1016 (e.g., an LCD) via display interface 1014 (e.g., a video card or the like).

The processing system 1000 may also include a network interface 1018 (e.g., a transceiver) to facilitate wired (e.g., Ethernet—802.3x) and/or wireless communication (WiFi/802.11x protocols, cellular technology, and the like) with external systems 1022 and/or databases 1020. External systems 1022 may include other processing systems, systems that provide third party services, etc. Here, external systems 1022 may be client devices or server systems. For example, the processing system 1000 may implement functionality of a client device or resource (e.g., where users receive a webcasted event and/or provide sentiment input) as described herein, thus the external system 1022 may be a sentiment analysis system or a webcasting system in communication with a client device. Conversely, the processing system 1000 may implement a sentiment analysis system and the external systems may include client devices.

External systems 1022 may also include network attached storage (NAS) to hold large amounts of data (e.g., thousands or millions of electronic documents, previously recorded webcasts, etc). External systems, along with the internal storage and memory, may form a storage system for storing and maintaining information (e.g., documents, presentations, webcasts, etc). Such a system may communicate with user and other computing resources (e.g., a client device, server, etc.) to provide webcasts, sentiment results, etc. The database 1020 may include relational, object orientated, or other types of databases for storing information (e.g., sentiment input).

In other words, the processes, techniques, and the like, described herein (for both client devices and server or controller systems) may be implemented on a computing system. Such implementations may then configure or program a processing system to carry out aspects according to certain example embodiments. It will be appreciated that other architecture types may be used. For example, a CPU may include multiple CPU "cores." In certain example embodiments, the display 1016 may be paired with a touch panel to create a touch screen display device. Further, the various elements shown in connection with FIG. 10 and/or FIG. 11 may be included into one cohesive physical structure (e.g., such as a tablet device). For example, the display, user input, and processing system may be included in the same housing or structure.

Figure 11:
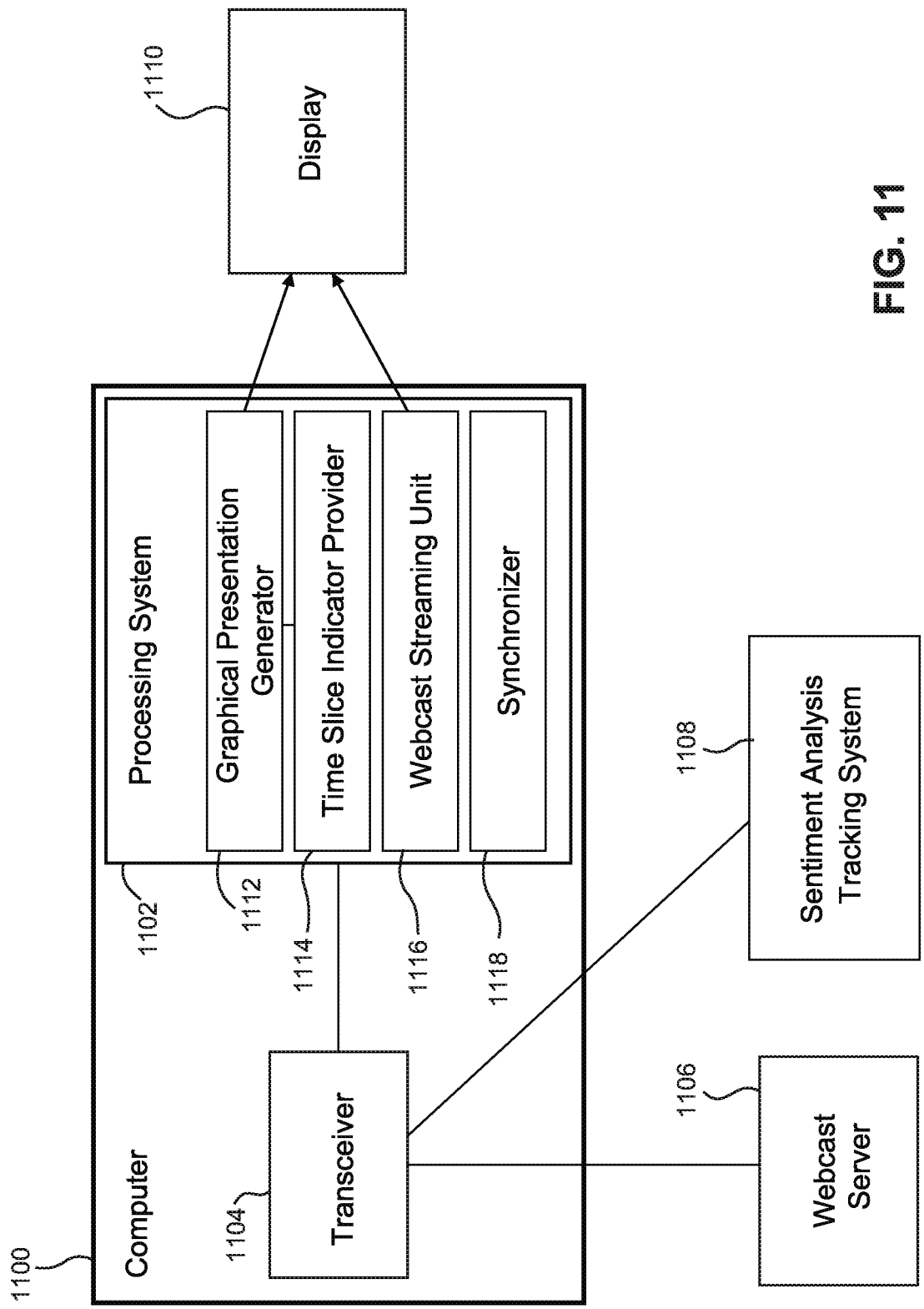
FIG. 11 is a block diagram of an example computing system for providing a graphical representation of sentiment for a webcasted event.

FIG. 11 is a block diagram of an example computing system for providing a graphical representation of sentiment for a webcasted event. A computer device 1100 includes a processing system 1102 and a transceiver 1104 (e.g., wireless or wired communications). The transceiver 1104 is configured to communicate with a webcast server 1106 to request and/or receive a webcasted stream. In certain examples, the webcasted stream is a previously recorded stream with already provided sentiment information. In other examples, the provided webcast stream is a live stream. The transceiver also communicates with a sentiment analysis tracking system 1108.

The sentiment analysis tracking system 1108 may provide real-time or delayed sentiment information in accordance with the provided webcast stream. In certain examples, the webcast server 1106 and the sentiment analysis tracking system 1108 are provided in the same computing system. In other examples, these systems are separate (or even operated by separate entities).

The processing system 1102 may include various modules or units. Graphical presentation generator 1112 provides a generated user interface to display 1110. The interface may include a display of sentiment information in an understandable format for a viewing user. For example, a graph or the like may be constructed based on the received sentiment data. In certain examples, the sentiment analysis tracking system provides the graphical display that is then subsequently output by the graphical presentation generator 1112. The displayed graphical indication of the sentiment data may be divided into a plurality of time slices or pieces of data that are individually (or collectively) viewable by a user. Accordingly, for example, the received sentiment information from the multiple users that provided feedback is individually (or collectively) display amongst each of the time slices.

While the interface is being output to the display 1110, a webcast streaming unit 1116 may also output the received webcast to display 1110. In certain examples, the webcast streaming unit decodes and/or translates the received webcast information into a display format suitable for output to the display 1110. The output webcast streaming unit thus provides the webcast to the display so that the webcast and graphical interface of the sentiment information are viewable at the same time by a user. For example, by overlaying the webcast stream over a portion of an output graph.

A time slice indicator provider 1114 is programmed to interface with the graphical presentation generator 1112 and provides an indicator to the display. The indicator graphically may show a user which portion of the graphical interface (e.g., a graph) is currently selected or of interest to the user. For example, the portion may be indicated by being highlighted or having the color changed.

A synchronizer 1118 is configured to synchronize a currently displayed portion of the webcast stream with the indicated time slice. Accordingly, a user may select a portion of a graph with a low sentiment value and automatically have the displayed webcast stream moved to that time of the webcast. This may allow a user to see what caused such a negative or positive audience reaction. Correspondingly, a user may adjust the displayed portion of the webcast and have a portion of a graph automatically highlighted that corresponds with selected time of the webcast.

In certain example embodiments, a client is a computing system (e.g., a laptop, tablet, smart phone, desktop computer, or the like). In certain example embodiments, a client may be a user that has a user account (e.g., associated with the user's email address or other unique login ID). Accordingly, sentiment tracking may be with respect to a specific device and/or with respect to a specific user (e.g., regardless of the device the user is using). For example, a user may start out viewing a webcast from a desktop PC and submit sentiment results, but later switch to viewing on a tablet device. When the client that the sentiment system tracks is related to the user (rather than the device) the user's preferences and prior sentiment history will "transfer" over when the user switches to a new device (e.g., because the system is not tracking the individual device). However, in certain instances the "client" may be a computer. In such cases, when the user switches over to another device, a new sentiment history and values may be assigned and used.

In certain examples, a streaming media player is provided on a computer system with buttons that appear within the interface if a sentiment application is enabled for an event. In certain examples, existing streaming media player computer applications may be upgraded or modified to provide sentiment feedback capability. In certain examples, a specialized media player is provided with integrated sentiment feedback capabilities for webcast viewing users. In certain examples, the sentiment analytics capability may be provided separately from the webcasting capability. Thus, a sentiment analysis organization may provide additional value to webcasting companies. While some of the examples herein relate to the provision of video over a webcast, the techniques herein may also be applied to audio only situations (e.g., conference calls and the like).

It will be appreciated that there are various ways to implement webcasting. For example, datagram protocols (e.g., UDP) may be used to transfer the stream of data of the webcast in a series of packets. This may be a relatively simple approach, but may lack functionality to guarantee delivery of the webcasted event to the user (e.g., because of network interruption or the like). Thus, the overall application (rather than the transporting mechanism) may be responsible for ensuring delivery of the webcast to the user.

Another approach is to use so-called "reliable" protocols that ensure packet delivery, such as, for example, TCP (transmission control protocol) and the like. However, in the case of network interruptions (e.g., dropped packets) there may be a need to re-transmit packets. This may cause sporadic delays in the presentation of the webcasted event. One solution to combat such periodic interruptions is to buffer the received webcasting. However, too much buffering may adversely affect the event experience for a user.

Other approaches to webcasting include the use of streaming protocols that are designed to transport streaming media. Such protocols may include RTP (Real-time Transport Protocol), RTSP (Real-time Streaming Protocol), or RTCP (Real-time Transport Control Protocol). Further, the techniques herein may carry out the webcasting of an event via multicasting (e.g., IP multicasting) and/or unicasting. As an example, in a corporate setting, a company may use multicast on their internal network to provide a webcasted event to their employees.

The description herein has been provided for purposes of explanation and non-limitation (e.g., specific details such as particular nodes, functional entities, techniques, protocols, standards, etc. in order to provide an understanding of the described technology). It will apparent to one skilled in the art that other embodiments may be practiced apart from the specific details disclosed below. In other instances, detailed descriptions of well-known methods, devices, techniques, etc. are omitted so as not to obscure the description with unnecessary detail.

Individual function blocks are shown in the figures. Those skilled in the art will appreciate that the functions of those blocks may be implemented using individual hardware circuits, using software programs and data in conjunction with a suitably programmed microprocessor or general purpose computer, using applications specific integrated circuitry (ASIC), and/or using one or more digital signal processors (DSPs). The software program instructions and data may be stored on computer-readable storage medium and when the instructions are executed by a computer or other suitable processor control, the computer or processor performs the functions.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred. A description of a process may be a description of an apparatus for performing the process. The apparatus that performs the process can include, e.g., a processor and those input devices and output devices that are appropriate to perform the process.

Various forms of computer readable media may be involved in carrying data (e.g., sequences of instructions) to a processor. For example, data may be (i) delivered from RAM to a processor via a computer bus; (ii) carried over a wireless transmission medium; (iii) formatted and/or transmitted according to numerous formats, standards or protocols, such as Ethernet (or IEEE 802.3x), SAP, ATP, Bluetooth, and TCP/IP, TDMA, CDMA, 3G, etc.; and/or (iv) encrypted to ensure privacy or prevent fraud in any of a variety of ways well known in the art.

Although various embodiments have been shown and described in detail, the claims are not limited to any particular embodiment or example. None of the above description should be read as implying that any particular element, step, range, or function is essential. All structural and functional equivalents to the elements of the above-described preferred embodiment that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, component, or step in this specification is intended to be dedicated to the public.

The invention claimed is:

1. A sentiment analysis computing system for tracking audience sentiment of a media stream for an event that is electronically transmitted to different electronic devices on which members of an audience view the media stream of the event, the sentiment analysis computing system comprising:
a non-transitory computer-readable medium configured to store sentiment input received from members of the audience of the transmitted media stream; and
a processing system that includes at least one hardware processor, the processing system configured to:
receive, via electronic data packets, sentiment inputs from different electronic devices used by different members of the audience and store the sentiment inputs to the non-transitory computer-readable medium;
for each one of a plurality of different time periods within the event:
(a) determine a plurality of validated audience sentiment inputs that are within a corresponding period of time of the media stream based on the sentiment inputs stored in the non-transitory computer-readable medium, wherein each one of the plurality of validated audience sentiment inputs is associated with a corresponding member identifier,
(b) adjust at least some of the validated audience sentiment inputs, wherein each corresponding adjusted validated audience sentiment input is adjusted based on (1) a number of validated audience sentiment inputs from other audience members in comparison to a total number of audience members within the corresponding period of time and (2) other stored sentiment inputs that are outside the corresponding period of time and are associated with the same corresponding member identifier as the validated audience sentiment input being adjusted, and
(c) calculate at least one sentiment value for the corresponding time period based at least in part on adjusted ones of the validated audience sentiment inputs; and
generate a sentiment analysis presentation that incorporates the calculated sentiment values for each one of the plurality of different time periods.

2. The sentiment analysis computing system of claim 1, wherein the member identifier is a unique identifier that is unique for a user, an organization, or a computer used by the user or organization.

3. The sentiment analysis computing system of claim 1, wherein calculation of the at least one sentiment value for the time period is further based on, for each member identifier, how many other sentiment inputs for that member identifier are received from outside of the time period.

4. The sentiment analysis computing system of claim 1, wherein the sentiment inputs received from the different members include negative sentiment inputs and positive sentiment inputs, wherein the negative and positive sentiment inputs include two or more degrees of sentiment, and
the calculated sentiment value is further based on an associated degree of sentiment.

5. The sentiment analysis computing system of claim 1, wherein the sentiment inputs received from the different members each include a timestamp,
wherein the plurality of validated audience sentiment inputs are determined based on the timestamp of the associated sentiment input in combination with a non-zero reaction time-delay factor.

6. The sentiment analysis computing system of claim 1, wherein an influence that a sentiment input, for a corresponding member identifier, has on the calculated at least one sentiment value for a given time period decreases as a function of a total number of sentiment inputs received for that corresponding member identifier for the media stream.

7. The sentiment analysis computing system of claim 1, wherein the processing system is further configured to:
overlay the generated sentiment analysis presentation with a displayed version of the media stream; and
synchronize an indicator, which indicates the period of time in the media stream, of the generated sentiment analysis presentation with the displayed version of the media stream.

8. The sentiment analysis computing system of claim 7, wherein the media stream is a pre-recorded version of the event.

9. The sentiment analysis computing system of claim 1, wherein, for each one of a plurality of different time periods within the event, the processing system is further configured to normalize each of the sentiment inputs against a total number of registered members for the event.

10. The sentiment analysis computing system of claim 1, wherein the processing system is further configured to:
overlay the generated sentiment analysis presentation with a displayed version of the media stream, where some portion of either the generated sentiment analysis presentation or the displayed version of the media stream is obscured by the other.

11. A non-transitory computer readable storage medium storing computer-executable instructions for use with a sentiment analysis system for determining audience sentiment of an event that is transmitted, via an electronic network, to different electronic devices associated with different members of an audience for the event, the sentiment analysis system including at least one processor and a transceiver, the stored computer-executable instructions comprising instructions that cause the at least one processor to:
receive, via the transceiver and from different ones of the electronic devices, electronic data packets that include a plurality of sentiment expression submissions that are each associated with a corresponding member identifier that distinguishes members from one another;
determine a plurality of time period segments during transmission of the event; for each one of the determined plurality of time period segments:
(1) obtain a valid plurality of sentiment expression submissions for a corresponding time period segment by only allowing one sentiment expression submission for each of the corresponding member identifiers within the corresponding time period segment to be included in the valid plurality of sentiment expression submissions for that corresponding time period segment,
(2) aggregate the valid plurality of sentiment expression submissions provided by members of the audience of the event,
(3) weight, as part of the aggregation, each valid sentiment expression submission that is within the time period segment as a function of (i) a number of valid sentiment expressions from other members of the audience in comparison to a total number of members of the audience within the corresponding time period segment and (ii) a number of other sentiment expressions that are outside the corresponding time period segment and associated with the same member identifier that is also associated with the valid sentiment expression submission being weighted, and
(4) calculate a sentiment value for the time period segment based on the aggregated plurality of valid sentiment expressions; and
generate a presentation that incorporates the calculated sentiment values for each one of the plurality of time period segments.

12. The non-transitory computer readable storage medium of claim 11, wherein an influence that a valid sentiment expression submission has over the calculated sentiment value decreases as a function of a number of other sentiment expression submissions that are outside the time period segment and associated with the same member identifier.

13. The non-transitory computer readable storage medium of claim 11, wherein the stored computer-executable instructions comprise further instructions that cause the at least one processor to:
weight, for each one of the determined plurality of time period segments, each valid sentiment expression submission that is within a given time period segment as a function of other sentiment expressions that are within the given time period segment and associated with a different member identifier.

14. The non-transitory computer readable storage medium of claim 11, wherein the valid plurality of sentiment expression submissions includes negative sentiment inputs and positive sentiment inputs, wherein the negative and positive sentiment inputs include two or more degrees of sentiment, and
the calculated sentiment value is further based on an associated degree of sentiment for a valid plurality of sentiment expression.

15. The non-transitory computer readable storage medium of claim 11, wherein the stored computer-executable instructions comprise further instructions that cause the at least one processor to:
overlay the generated presentation with a displayed version of the event; and
synchronize an indicator, which indicates a determined one of the plurality of time period segments, with the time of the event that the time period segment corresponds to.

16. The non-transitory computer readable storage medium of claim 15, wherein the calculated sentiment value of a given time period segment is displayed with the indicator.

17. A method of tracking audience sentiment of a media stream for an event that is electronically transmitted to different electronic devices on which members of an audience view the media stream of the event, the method comprising:
- storing, via a non-transitory computer-readable medium, sentiment input received from members of the audience of the transmitted media stream; and
- processing, via a processing system that includes at least one hardware processor, the sentiment input, the processing comprising:
  - receiving, via electronic data packets, sentiment inputs from different electronic devices used by different members of the audience and storing the sentiment inputs to the non-transitory computer-readable medium;
  - for each one of a plurality of different time periods within the event:
    - (a) determining a plurality of validated audience sentiment inputs that are within a corresponding period of time of the media stream based on the sentiment inputs stored in the non-transitory computer-readable medium, wherein each one of the plurality of validated audience sentiment inputs is associated with a corresponding member identifier,
    - (b) adjusting at least some of the validated audience sentiment inputs, wherein each corresponding adjusted validated audience sentiment input is adjusted based on (1) a number of validated audience sentiment inputs from other audience members in comparison to a total number of audience members within the corresponding period of time and (2) other stored sentiment inputs that are outside the corresponding period of time and are associated with the same corresponding member identifier as the corresponding validated audience sentiment input that is adjusted, and
    - (c) calculating at least one sentiment value for the time period based at least in part on adjusted ones of the validated audience sentiment inputs; and
  - generating a sentiment analysis presentation that incorporates the calculated sentiment values for each one of the plurality of different time periods.

18. The method of claim 17, wherein the member identifier is a unique identifier that is unique for a user, an organization, or a computer used by the user or organization.

19. The method of claim 17, wherein calculation of the at least one sentiment value for the time period is further based on, for each member identifier, how many other sentiment inputs for that member identifier are received from outside of the time period.

* * * * *